Nov. 14, 1950

J. R. CARRIS 2,529,676

TONE ARM

Filed April 5, 1945

INVENTOR.
Jerry R. Carris,
BY Bair & Freeman
Att'ys.

Patented Nov. 14, 1950

2,529,676

UNITED STATES PATENT OFFICE 2,529,676

TONE ARM

Jerry R. Carris, Washington, Iowa, assignor of one-half to Riley R. Osborn, Chicago, Ill.

Application April 5, 1945, Serial No. 586,751

5 Claims. (Cl. 274—23)

My present invention relates to a tone arm for phonographs and the like which is so constructed that the needle is always tangent to the groove no matter what position on the record the needle happens to be.

One object of the invention is to provide a simple and inexpensive leverage arrangement for the tone arm which insures tangency of the needle to the groove at any radial position of the needle.

Another object is to provide a secondary arm pivoted to the tone arm on which a needle is mounted in such manner that it is normal to a radial center line extending lengthwise of the secondary arm and the secondary arm is guided in a predetermined path by a center pin of the phonograph.

Still another object is to provide the secondary arm with a swinging motion if required for swinging it clear of the record where the record changing mechanism is of the type that drops a record downwardly onto the turntable of the phonograph.

With these and other objects in view my invention consists in the construction, arrangement and combination of the various parts of my device whereby the objects contemplated are attained, as hereinafter more fully set forth, pointed out in my claims and illustrated in the accompanying drawings, wherein:

Figures 1, 2, 3:
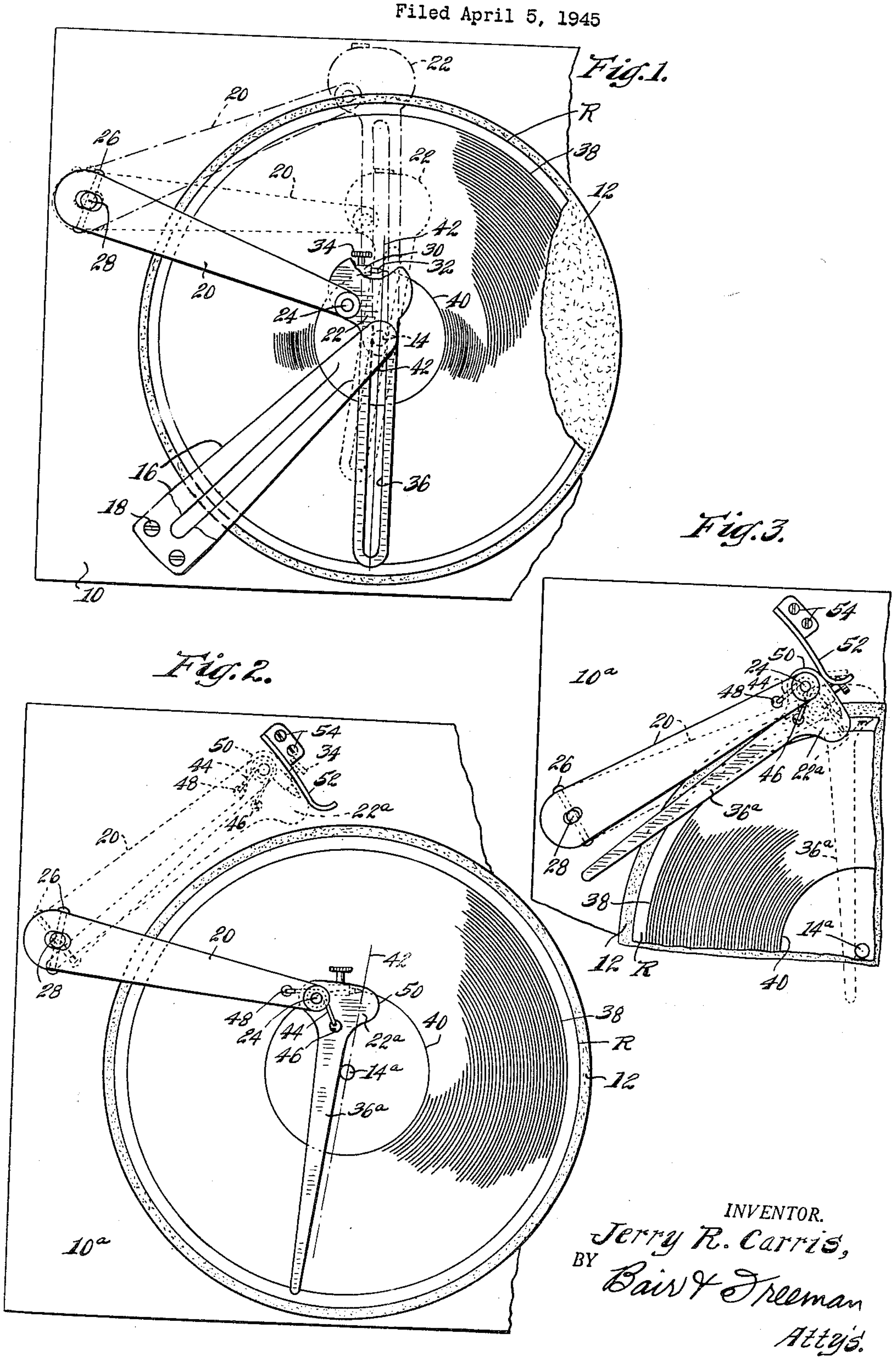
Figure 1 is a plan view of a tone arm embodying my invention and showing it connected with a phonograph of the drop table type wherein the table is dropped for changing records.
Figure 2 is a plan view of a modified construction showing it mounted on a phonograph having a drop record type of record changer.
Figure 3 is a view of a portion of Figure 2 showing different positions of the parts during operation.

On the accompanying drawing I have used the reference numeral 10 to indicate a housing for a phonograph and 12 a turntable of the phonograph. The turntable is rotated by any suitable means about a center defined by a center pin 14. The center pin 14 in this instance is stationary and depends from a bracket 16 secured as by screws or the like 18, to the phonograph housing 10. The turntable 12 is adapted to have a record R placed thereon for rotation thereby.

My improved tone arm comprises a primary arm 20 and a secondary arm 22 pivoted thereto as at 24. The primary arm 20 is pivoted as at 26 to a vertical shaft 28. The secondary arm 22 carries a needle holder 30 which supports the needle 32. The needle is usually held in position as by a set screw 34.

The secondary arm 22 is slotted as shown at 36 and the slot receives the center pin 14. Accordingly, the secondary arm 22 will swing as shown by dot and dash lines as the primary arm 20 goes from the fully in position to the fully out position. The turntable rotates for playing the record and the needle 32 follows the groove in the record until the inner limit 40 is reached.

The needle 32 is mounted exactly at right angles to a center line 42 which center line passes through the center of the centering pin 14 and through the center of the slot 36. The point of the needle is at the line 42 and therefore regardless of the position of the secondary arm 22, it holds the needle in alignment with, or tangent to, the circle of the groove. Thus by a very simple arrangement involving the use of a secondary arm 22 and the centering pin 14, absolute assurance of the needle being tangent to the groove at all positions is had. This is very important from the standpoint of needle and record wear.

Most tone arms cause the needle to be out of alignment with the groove at all excepting one position. This causes a twisting of the needle in the groove that wears the needle down to a chisel point and tears the sides of the groove, thereby shortening both needle life and record life materially. I have found that in my arrangement the life of both the needle and the record can be increased many fold.

In Figures 2 and 3 I show a modified arrangement wherein the secondary arm, indicated at 22*a* is somewhat different in that it has a straight side 36*a* instead of a slot 36. This side is held against a center pin 14*a* which in this case can be the center pin of the table 12 for the record R that rotates with the table. The center line 42 for the needle point passes through the center pin 14*a* and is spaced a distance from the edge 36*a* corresponding to the radius of the center pin. This edge is then held against the pin by a spring 44 which is wound around the pivot 24 and has its opposite ends connected as at 46 and 48 with the secondary arm 22*a* and the main arm 20 as shown.

The arrangement shown in Figures 2 and 3 is for a record changer of the drop record type which requires that the tone arm be clear of the record during the time that the records are being changed. This is accomplished by a cam lobe 50 on the secondary arm 22*a* engaging a stationary cam 52 anchored as by screws 54 to the phonograph housing 10*a*. As shown in Figure 3 when the primary arm reaches the dotted line position, the cam 50 engages the cam 52 and further movement of the arm 20 is to the full line position starts swinging the cam 50 and the arm **22*a* as to said full line position. Finally when the arm 20 moves to the dotted position of Figure 2, the arm 22*a*** is clear of the record so that the next record can be dropped into position for being played on the phonograph.

From the foregoing specification, it will be observed that I have provided a very simple arrangement which assures that the needle of a phonograph will be tangent to the groove in a positive manner at all possible positions of the needle radially of the record. The device can be easily applied to either the drop table or the drop record type of record changer without undue complications. With my arrangement record life and needle life can be materially increased without increasing the cost of production for the phonograph to any appreciable extent.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. In a tone arm for phonographs and the like, a primary arm, a secondary arm pivoted thereto, a needle supported by said secondary arm, and a center pin, said secondary arm being engageable with said center pin to maintain a relation between said needle and the record groove wherein the needle is tangent to the groove at all positions of the secondary arm.

2. In a tone arm for phonographs and the like, a primary arm pivoted at one end to the phonograph, a secondary arm having one end pivoted to the other end of said primary arm, a needle fixed in relation to said one end of said secondary arm, and a center pin aligned with the center of rotation of the record, said secondary arm having one side parallel to a line through both the point of said needle and said center pin, said side being confined to slide against said pin to maintain a tangential relation between said needle and the record groove at all positions of said secondary arm.

3. A tone arm structure comprising a primary arm, a secondary arm pivoted thereto, a center pin at the center of rotation of the record, a needle carried by said secondary arm at right angles to a radius line extending longitudinally with relation to said secondary arm, said center pin being engaged by said secondary arm at a point on a line parallel to said radial line and spaced therefrom a distance equal to the radius of said center pin.

4. In a tone arm of the character disclosed, a primary arm, a secondary arm pivoted thereto, a needle carried by said secondary arm, a pin at the center of rotation of the record, said secondary arm being engageable with said pin to guide the secondary arm so that said needle is at all times at right angles to a radial line from said pin, said secondary arm having cam means for swinging the same to a position substantially outside the periphery of the record upon movement of said primary arm to an outer position with respect to the record.

5. In a tone arm, a primary arm, a secondary arm pivoted to said primary arm, a needle carried by said secondary arm, a center pin, said secondary arm being engageable with said center pin to guide the secondary arm so that said needle is at all times tangent to the record groove, and means for swinging said secondary arm clear of the record upon movement of said primary arm to an outer position with respect to the record.

JERRY R. CARRIS.

REFERENCES CITED

The following references are of record in the file of this patent:

UNITED STATES PATENTS

| Number | Name | Date |
|---|---|---|
| 1,178,840 | Cassard | Apr. 11, 1916 |
| 1,349,636 | Swing | Aug. 17, 1920 |
| 2,025,300 | Mueller | Dec. 24, 1935 |

FOREIGN PATENTS

| Number | Country | Date |
|---|---|---|
| 322,663 | Great Britain | Dec. 12, 1929 |